United States Patent
Liu et al.

(10) Patent No.: US 9,651,733 B2
(45) Date of Patent: May 16, 2017

(54) BACK PLATE AND METHOD FOR MANUFACTURING THE SAME AND BACKLIGHT MODULE

(71) Applicant: Radiant Opto-Electronics Corporation, Kaohsiung (TW)

(72) Inventors: Tsung-Hsin Liu, Kaohsiung (TW); Qing-Song Li, Kaohsiung (TW); Chih-Ming Chan, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 30 days.

(21) Appl. No.: 14/690,488

(22) Filed: Apr. 20, 2015

(65) Prior Publication Data

US 2016/0223738 A1     Aug. 4, 2016

(30) Foreign Application Priority Data

Feb. 2, 2015   (TW) .............................. 104103432 A

(51) Int. Cl.
| | |
|---|---|
| *F21V 7/04* | (2006.01) |
| *F21V 8/00* | (2006.01) |
| *B23K 26/21* | (2014.01) |

(52) U.S. Cl.
CPC ............ *G02B 6/0088* (2013.01); *B23K 26/21* (2015.10); *G02B 6/005* (2013.01); *G02B 6/009* (2013.01); *G02B 6/0068* (2013.01)

(58) Field of Classification Search
CPC ... G02F 1/133308; G02F 2001/133314; G02F 2201/465; G09F 9/301; G09F 9/35
USPC .................................. 362/600–634, 97.1–97.4
See application file for complete search history.

(56) References Cited

U.S. PATENT DOCUMENTS

| | | | |
|---|---|---|---|
| 7,787,097 B2 * | 8/2010 | Satoh | ................ G02F 1/133305 349/158 |
| 2011/0096262 A1 * | 4/2011 | Kikuchi | .................. G09F 9/301 349/58 |
| 2012/0168058 A1 | 7/2012 | Kim et al. | |
| 2015/0000823 A1 | 1/2015 | Kim et al. | |
| 2015/0268412 A1 * | 9/2015 | Lee | ....................... G02B 6/0091 362/613 |

(Continued)

FOREIGN PATENT DOCUMENTS

| | | |
|---|---|---|
| CN | 01133434 A | 2/2008 |
| CN | 02077263 A | 5/2011 |

(Continued)

*Primary Examiner* — William Carter
(74) *Attorney, Agent, or Firm* — CKC & Partners Co., Ltd.

(57) ABSTRACT

A back plate, a method for manufacturing the back plate and a backlight module are provided. The method for manufacturing the back plate includes the following steps. A main body is provided. The main body includes a bottom portion and at least one sidewall connected to the bottom portion. The sidewall has a plurality of grooves, and each of the grooves has a first side surface and a second side surface. A first recess and a second recess corresponding to the first recess are respectively disposed on the first side surface and the second side surface. An external force is applied on the bottom portion to form each of the bottom portion and the sidewalls into arc shape, in which the first side surface contacts the second side surface of each groove, and a hole portion is formed between the first recess and the second recess.

14 Claims, 13 Drawing Sheets

(56) References Cited

U.S. PATENT DOCUMENTS

2016/0109647 A1* 4/2016 Hsiao ................ G02F 1/133308
                                                                     362/634

FOREIGN PATENT DOCUMENTS

| CN | 03807814 A | 5/2014 |
|----|------------|--------|
| CN | 104238160 A | 12/2014 |
| TW | M483445 U | 8/2014 |
| TW | M491853 U | 12/2014 |
| WO | 2012081504 A1 | 6/2012 |

* cited by examiner

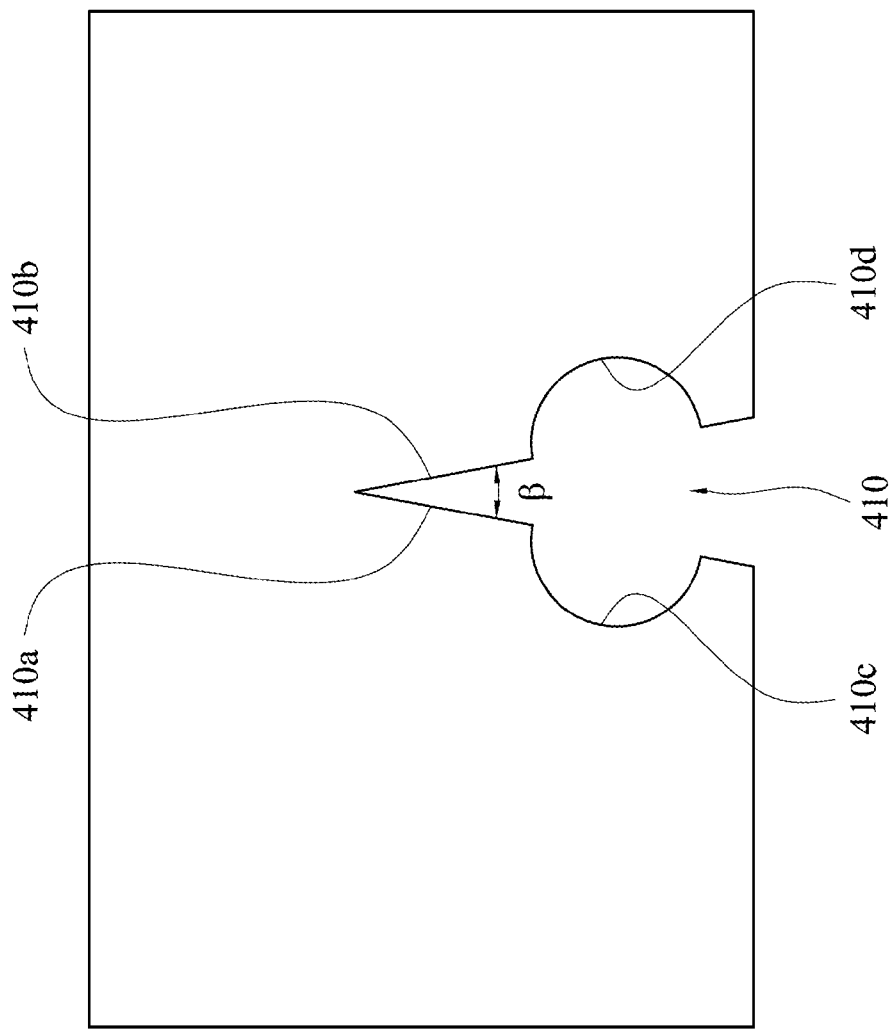

BACK PLATE AND METHOD FOR MANUFACTURING THE SAME AND BACKLIGHT MODULE

RELATED APPLICATIONS

This application claims priority to Taiwan Application Serial Number 104103432, filed Feb. 2, 2015, which is herein incorporated by reference.

BACKGROUND

Field of Invention

The present invention relates to a back plate. More particularly, the present invention relates to a back plate and a method for manufacturing the same and a backlight module.

Description of Related Art

Liquid crystal displays become more diversified to meet market requirements. For the liquid crystal displays on the market nowadays, one kind of curved liquid crystal display is developed to generate a wider view angle and a better virtual effect.

There are two types of back plate which are applicable to the curved liquid crystal displays. One type is a back plate implemented with a stepped structure on the bottom. The stepped structure can be used to support a light guide plate, and the light guide plate can be put along the profile of the stepped structure. The other type is a back plate having reinforcing ribs additionally soldered or fastened on its bottom so as to be formed into arc shape. However, the structures of the aforementioned back plates are complicated and cannot be manufactured easily, which is disadvantageous to controlling the curvatures of the back plates and fails to precisely position other members in the back plate, thus leading to a wrinkle problem of optical films and affecting optical appearance.

SUMMARY

One object of the present invention is to provide a back plate and a method for manufacturing the same and a backlight module, which can simplify the structure of the back plate and control the curvature of the back plate precisely.

According to the aforementioned object, a method for manufacturing a back plate. The method for manufacturing the back plate includes the following steps. A main body is provided, in which the main body includes a bottom portion and at least one sidewall connected to the bottom portion. The sidewall has a plurality of grooves. Each of the grooves has a first side surface and a second side surface, in which a first recess and a second recess corresponding to the first recess are respectively disposed on the first side surface and the second side surface. An external force is applied on the bottom portion to form each of the bottom portion and the sidewalls into arc shape, in which the first side surface contacts the second side surface of each groove, and a hole portion is formed between the first recess and the second recess.

According to an embodiment of the present invention, the method for manufacturing the back plate further includes, after the step of applying the external force on the bottom portion, performing a connecting process to connect the first side surface to the second side surface of each groove.

According to an embodiment of the present invention, the connecting process includes using a laser welding method, a screwing method or an adhering method.

According to an embodiment of the present invention, the step of preparing the main body further includes the following steps. A plate is provided, in which the plate has at least one edge portion. The grooves are formed on the edge portion. The edge portion is bent to form the sidewall.

According to an embodiment of the present invention, the step of forming the grooves includes using a stamping process.

According to an embodiment of the present invention, the step of applying the external force on the bottom portion includes an operation of using a stamping gauge.

According to an embodiment of the present invention, each of the grooves is a V-shaped structure.

According to the aforementioned objects, a back plate is provided. The back plate includes a bottom portion and at least one sidewall. The bottom portion has a curvature. The sidewall is connected to the bottom portion, in which the sidewall has a curvature which is corresponding to the curvature of the bottom portion, and the sidewall has a plurality of hole portions and a plurality of connecting portions adjacent to the hole portions.

According to the aforementioned objects, a backlight module is provided. The backlight module includes a back plate, a light guide plate, at least one light source and a frame. The back plate includes a bottom portion and at least one sidewall connected to the bottom portion, in which the bottom portion has a curvature corresponding to a curvature of the sidewall, and the sidewall has a plurality of hole portions and a plurality of connecting portions adjacent to the hole portions. The light guide plate is disposed on the back plate, in which the light guide plate has at least one light-incident surface, and a curvature of the light guide plate is corresponding to the curvature of the bottom portion. The light source is disposed on the back plate and is adjacent to the light-incident surface of the light guide plate. The frame is disposed on the back plate, in which there are plural connecting structures disposed on the at least one outer side surface of the frame corresponding to the sidewall. The connecting structures are connected to the hole portions.

According to an embodiment of the present invention, each of the connecting structures is a convex portion or a screwing member.

According to an embodiment of the present invention, the light guide plate includes at least one side surface with curvature and at least one side surface without curvature. The light-incident surface is the side surface with curvature.

According to an embodiment of the present invention, the light guide plate includes at least one side surface with curvature and at least one side surface without curvature. The light-incident surface is the side surface without curvature.

According to an embodiment of the present invention, the frame has a curvature corresponding to the curvature of the bottom portion.

According to an embodiment of the present invention, the backlight module further includes a reflecting film. The reflecting film is disposed on a bottom surface of the light guide plate, in which a curvature of the reflecting film is corresponding to the curvature of the light guide plate.

According to an embodiment of the present invention, the backlight module further includes at least one optical film. The optical film is disposed on a light-emitting surface of the light guide plate, in which a curvature of the optical film is corresponding to the curvature of the light guide plate.

According to the above embodiments, the present invention uses the design of the grooves and the stamping process to manufacture an arc-shaped back plate, so as to simplify conventional steps of manufacturing the arc-shaped back plate and decrease the fabrication cost. In addition, the shape or the curvature of the back plate can be precisely adjusted by varying the opening angle of each groove, the number of the grooves or the shape of the stamping gauge.

On the other hands, while the arc-shaped back plate is formed, the hole portions are formed from the grooves accordingly. Moreover, the hole portions can be directly connected to the corresponding connecting structures of the frame, so as to achieve an object of rapidly assembling the backlight module.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3 is a schematic structural diagram showing a groove in accordance with an embodiment of the present invention;

DETAILED DESCRIPTION

Figure 1:
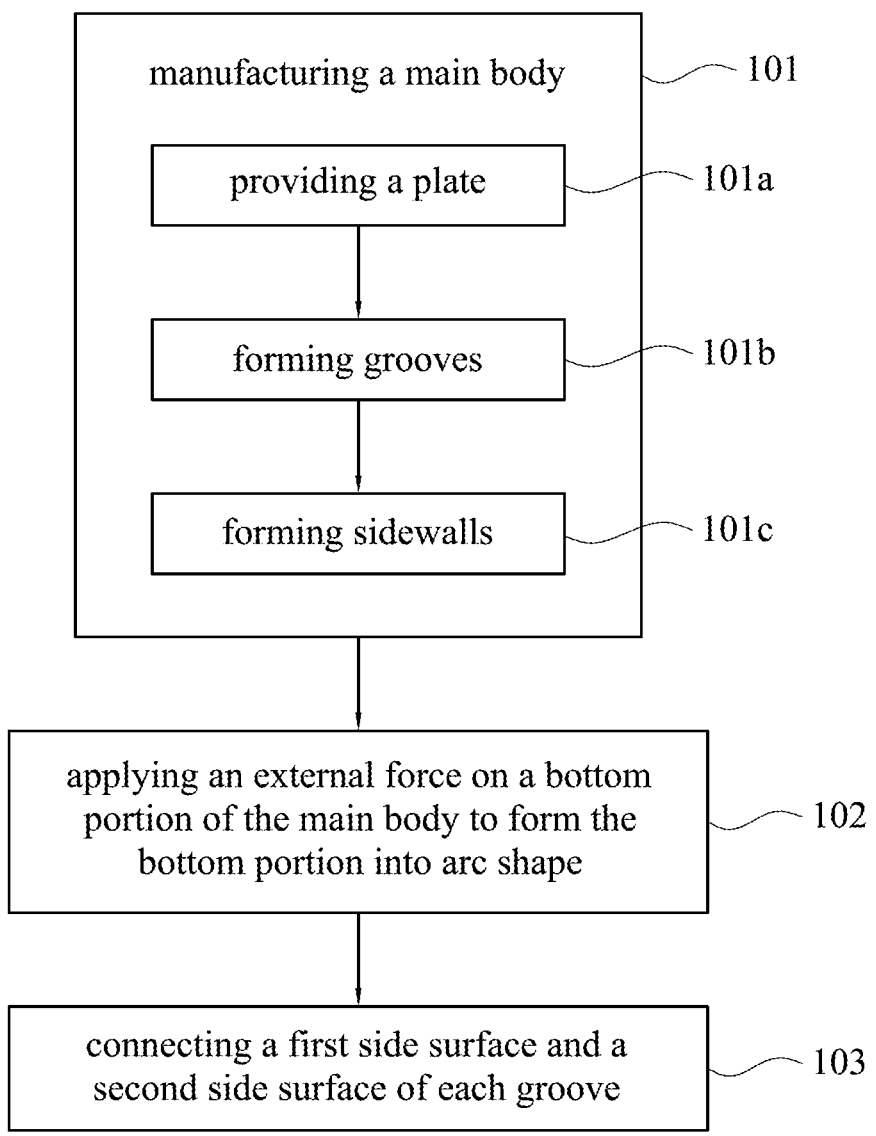
FIG. 1 is a flow chart showing a method for manufacturing a back plate in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2A:
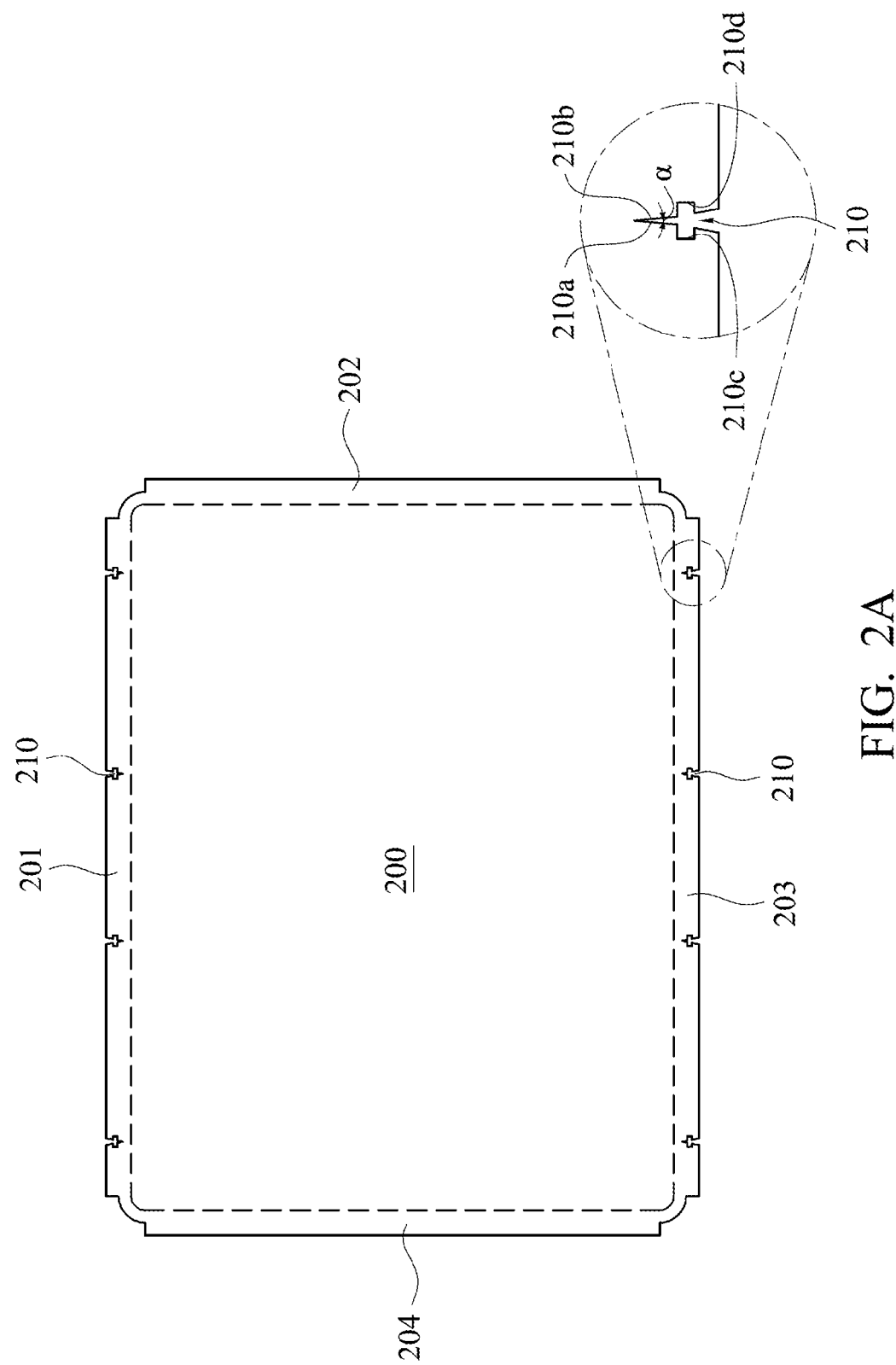
FIG. 2A-FIG. 2E are schematic diagrams of intermediate stages showing the method for manufacturing the back plate in accordance with an embodiment of the present invention.
Figure 2B:
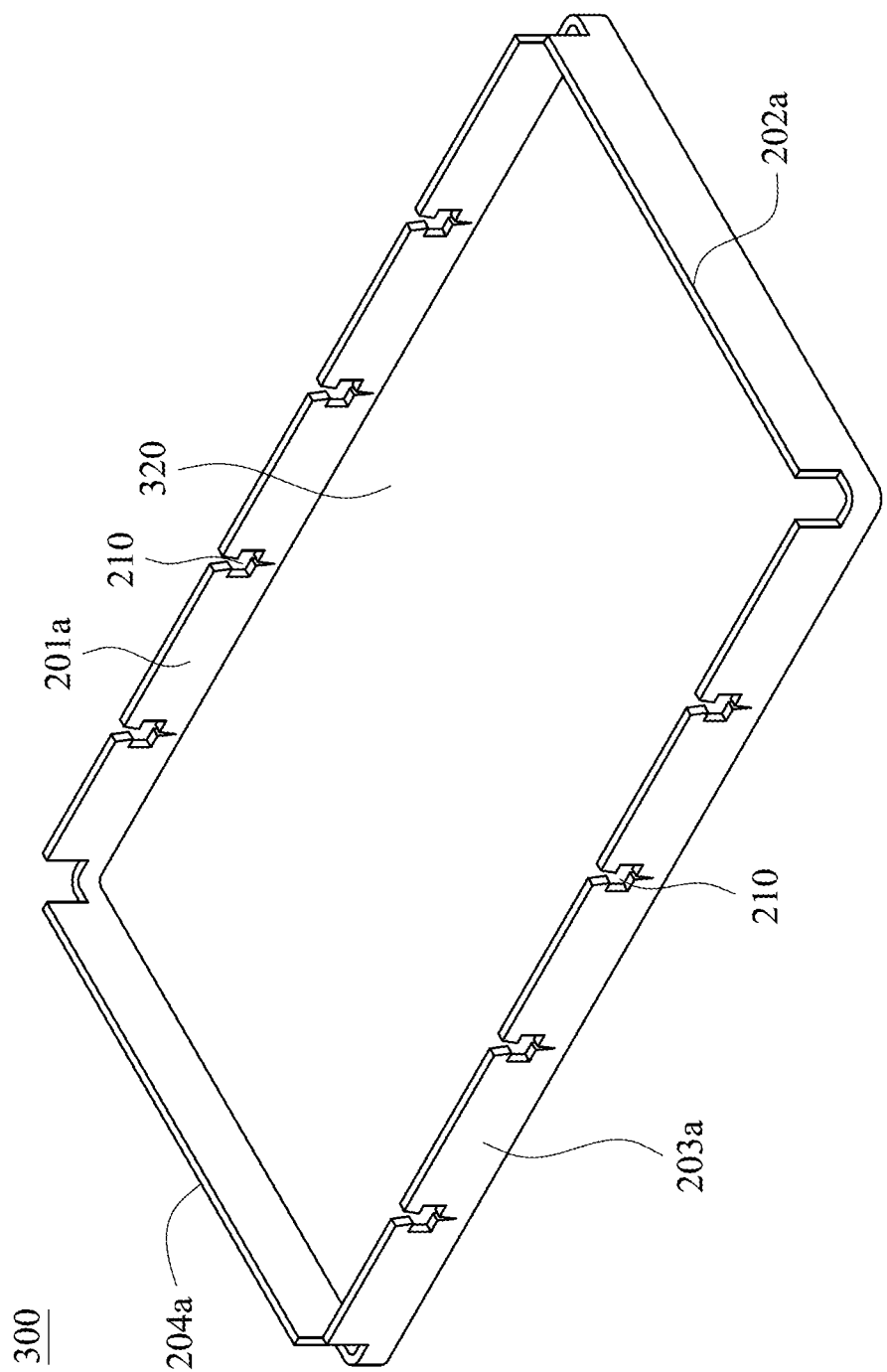

Simultaneously referring to FIG. 1 and FIG. 2A-FIG. 2E, FIG. 1 is a flow chart showing a method for manufacturing a back plate in accordance with an embodiment of the present invention, and FIG. 2A-FIG. 2E are schematic diagrams of intermediate stages showing the method for manufacturing the back plate in accordance with an embodiment of the present invention. A method 100 for manufacturing a back plate is provided as an embodiment of the present invention. In the method 100, step 101 is performed to manufacture a main body 300 (as shown in FIG. 2B).

In one embodiment, the step of manufacturing the main body 300 includes the following steps. First, as described in step 101a, a plate 200 as shown in FIG. 2A is provided. In one example, the plate 200 is rectangular and includes four edge portions 201, 202, 203 and 204. The edge portions 201, 202, 203 and 204 can be regarded as four portions of the plate 200 near four edge sides respectively. Then, as described in step 101b, plural grooves 210 are formed on the two of opposite edge portions, such as edge portions 201 and 203. In one embodiment, the grooves 210 can be formed by stamping process.

Referring to FIG. 2A, each of the grooves 210 is a V-shaped structure which has a first side surface 210a and a second side surface 210b. Moreover, the first side surface 210a and the second side surface 210b are respectively implemented with a first recess 210c and a second recess 210d corresponding to each other. As shown in the embodiment of FIG. 2A, each of the first recess 210c and the second recess 210d is a rectangular structure. In the present embodiment, there is an opening angle α between the first side surface 210a and the second side surface 210b, and the dimension of the opening angle α can be designed according to different requirements.

In other embodiments, the grooves 210 may have different designs. Referring to FIG. 3, FIG. 3 is a schematic structural diagram showing a groove 410 in accordance with an embodiment of the present invention. In the embodiment of FIG. 3, the groove 410 is also a V-shaped structure which has a first side surface 410a and a second side surface 410b. In addition, a first recess 410c and a second recess 410d of the groove 410 are circular-arc structures corresponding to each other. In some embodiments, there is an opening angle β between the first side surface 410a and the second side surface 410b, and the dimension of the opening angle β can be designed according to different requirements.

After the grooves 210 are formed on the plate 100 (as shown in FIG. 2A), as described in step 101c, the edge portions 201, 202, 203 and 204 are bent upwards to form sidewalls 201a, 202a, 203a and 204a (as shown in FIG. 2B), in which other portion besides the sidewalls 201a, 202a, 203a and 204a can be defined as a bottom portion 320 of the main body 300. It is noted that, in the aforementioned steps, the grooves 210 are formed on the edge portions 201 and 203, hence the sidewalls 201a and 203a formed from the edge portions 201 and 203 have grooves 210 accordingly, and the sidewalls 202a and 204a do not have grooves.

Figure 2C:
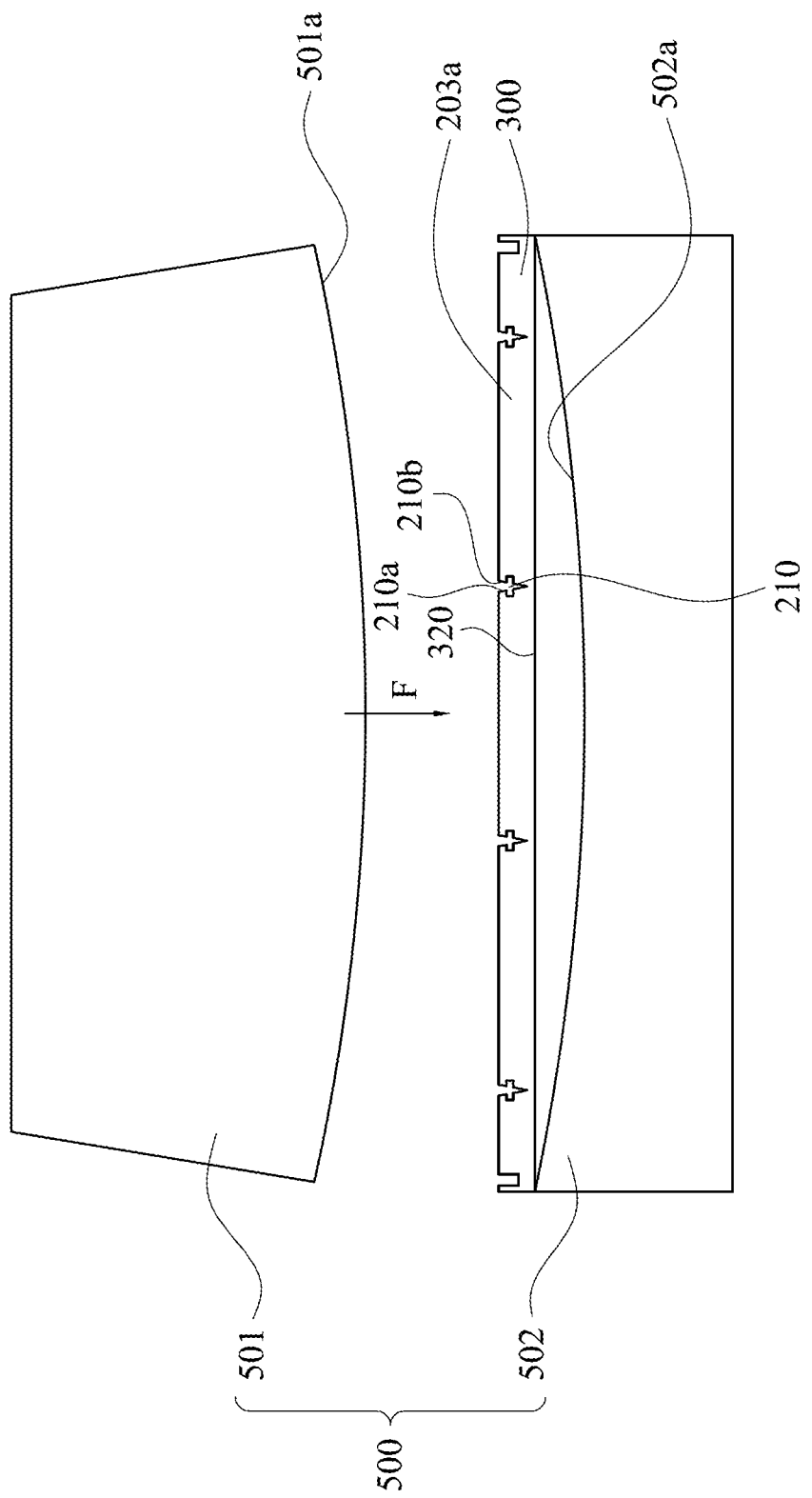

After finishing manufacturing of the main body 300, as described in step 102, an external force F (as shown in FIG. 2C) is applied on the bottom portion 320 of the main body 300. In one embodiment, the main body 300 can be stamped by a stamping gauge 500. As shown in FIG. 2C, the stamping gauge 500 includes a male die 501 and a female die 502. Moreover, the male die 501 includes an arc surface 501a, and the female die 502 includes an arc surface 502a corresponding to the arc surface 501a of the male die 501, so that a curvature of the arc surface 502a is equal to that of the arc surface 501a. Therefore, after the main body 300 is placed on the female die 502, the bottom portion 320 of the main body 300 can be stamped by the male die 501, so as to form the bottom portion 320 of the main body 300 into arc shape, in which the opposite top surface and bottom surface of the bottom portion 320 respectively abut the arc surface 501a and 502a.

Figure 2D:
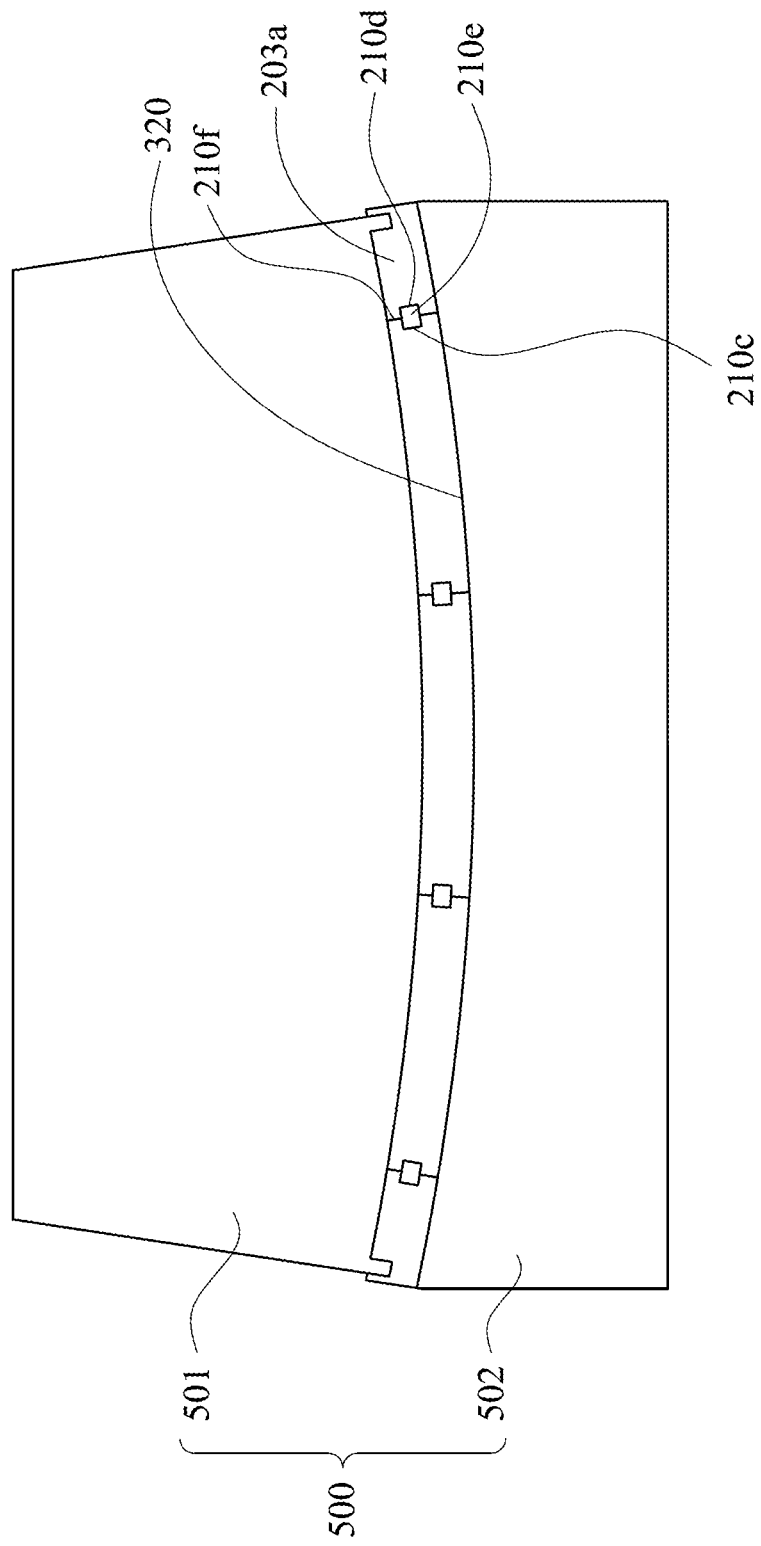

Moreover, during the stamping formation of the main body 300, the sidewalls 201a and 203a thereof also generate arcs along with the arc formation at the bottom portion of the main body 300. While the sidewalls 201a and 203a are being formed to have curvatures, the first side surface 210a and the second side surface 210b of each groove 210 are getting closer until the first side surface 210a abuts the second side surface 210b. In addition, as shown in FIG. 2D, when the first side surface 210a abuts the second side surface 210b, a hole portion 210e is formed between the first recess 210c and the second recess 210d, and connecting portions 210f between the first side surface 210a and the second side surface 210b are located adjacent to the hole portion 210e. Therefore, the curvature of the bottom portion 320 can be changed by adjusting curvatures of the arc surface 501a and 502a, the dimension of the opening angle α, or the number of the grooves 210.

Figure 2E:
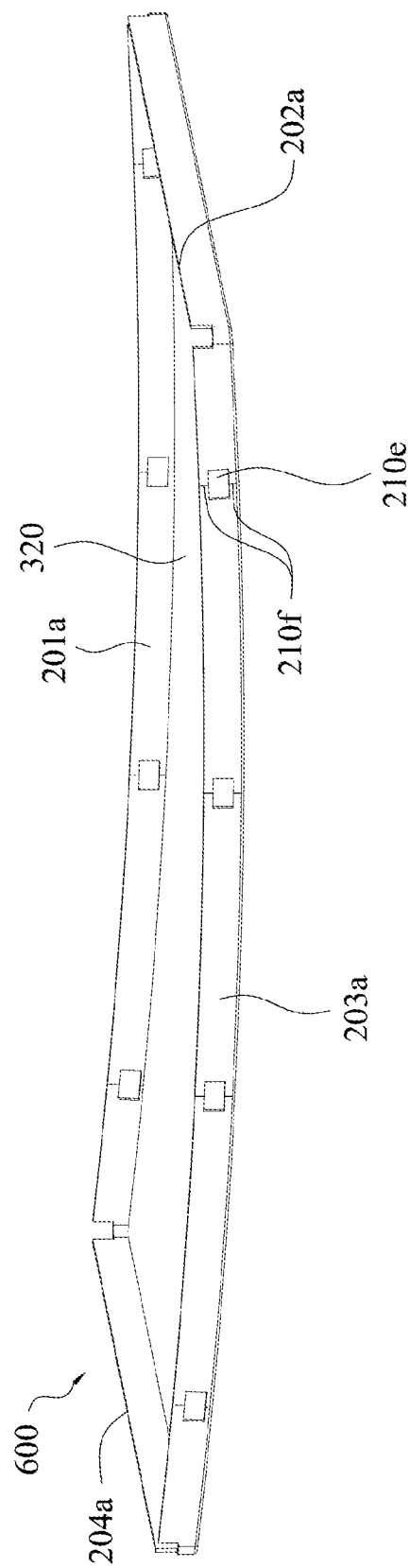

Simultaneously referring to FIG. 1, FIG. 2C and FIG. 2D, after the first side surface 210a abuts the second side surface 210b, as described in step 103, a connecting process is performed to connect the first side surface 210a and the second side surface 210b, so as to form a back plate 600 as shown in FIG. 2E. In some embodiments, the connecting process includes using a laser welding method, a screwing method or an adhering method. Therefore, the structural strength of the sidewalls 201a and 203a can be enhanced through the connecting process.

Referring to FIG. 2E, the back plate 600 mainly includes the bottom portion 320 and the sidewalls 201a, 202a, 203a and 204a connected to the bottom portion 320, in which the bottom portion 320 has the curvature, and the two opposite sidewalls 201a and 203a also have the curvature corresponding to the bottom portion 320 respectively. In addition, the opposite sidewalls 201a and 203a have the hole portions 210e and the connecting portions 210f adjacent to the hole portions 210e. In some examples, the shape of the hole portions 210 is rectangular, circular, elliptical, rhombus, trapezoid, triangular or polygon. It is noted that, the back plate 600 is applicable to a backlight module or other light source modules, so that the hole portions 210e can be used to be connected with other members of the backlight module or the light source modules.

Figure 4:
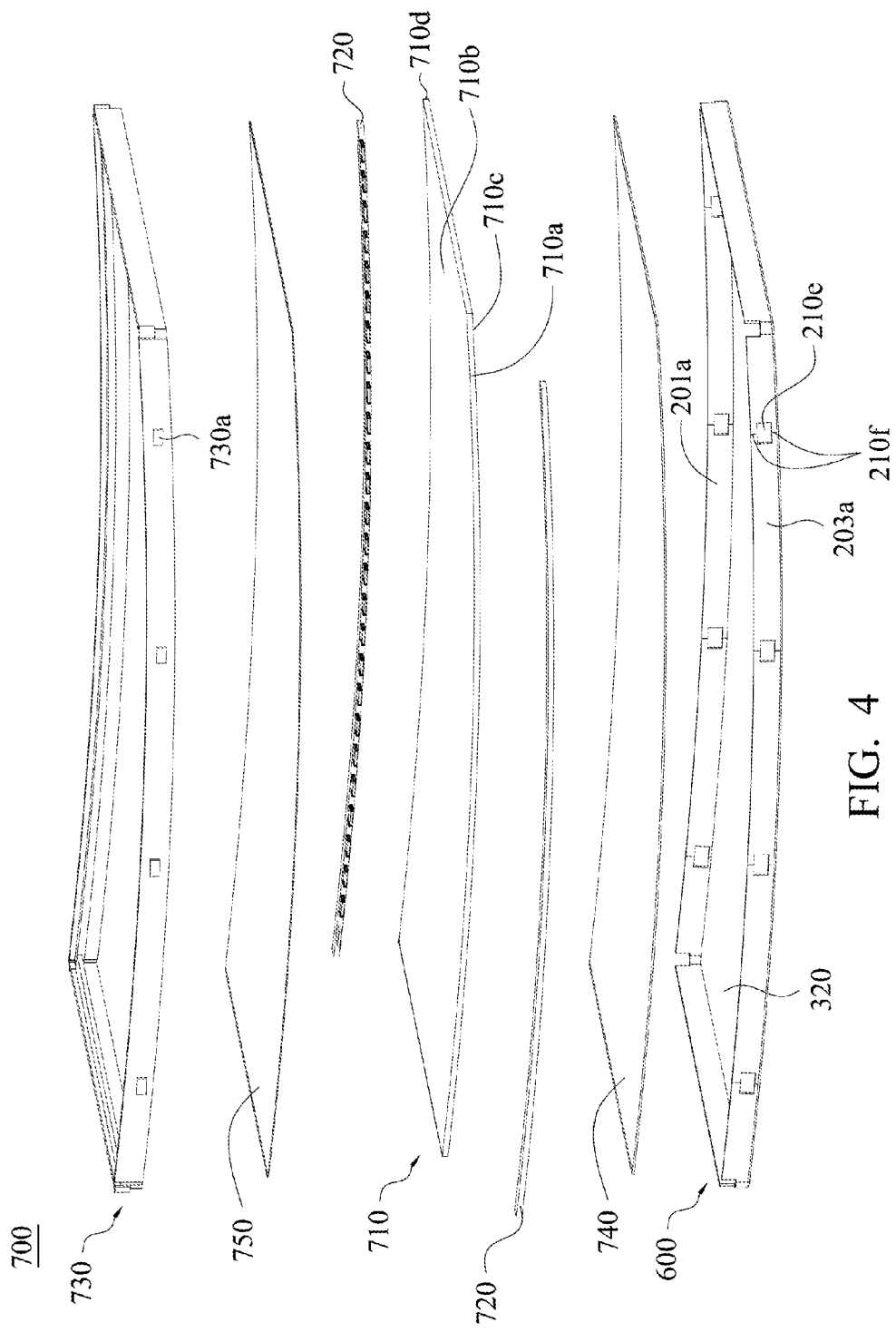
FIG. 4 is a schematic exploded view showing a backlight module in accordance with a first embodiment of the present invention.
Figure 5:
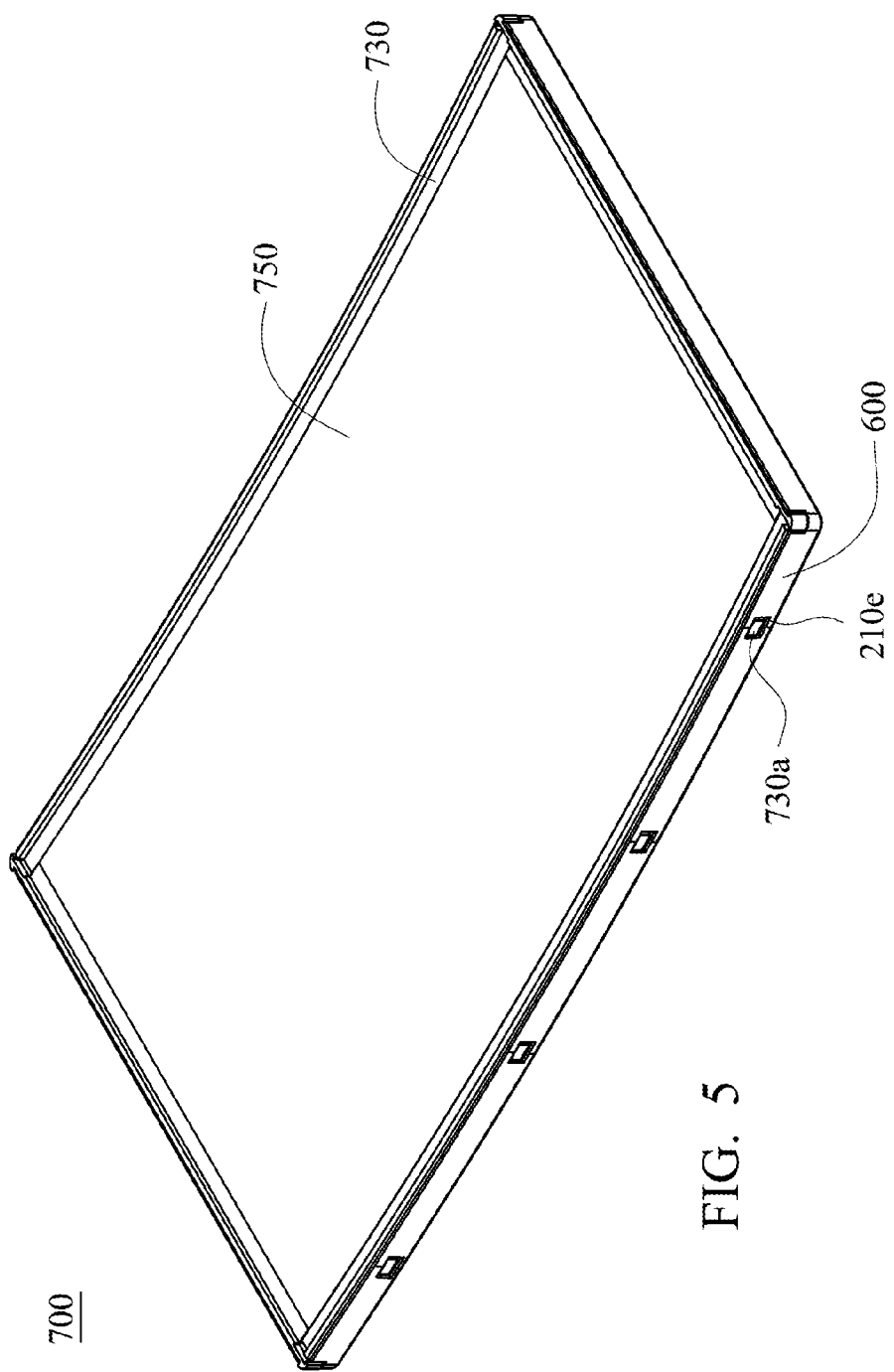
FIG. 5 is a schematic structural diagram showing the backlight module in accordance with the first embodiment of the present invention.

Simultaneously referring to FIG. 4 and FIG. 5, FIG. 4 and FIG. 5 are a schematic exploded view and a schematic structural diagram showing a backlight module 700 in accordance with a first embodiment of the present invention. The backlight module 700 includes the aforementioned back plate 600, a light guide plate 710, at least one light source 720, a frame 730, a reflecting film 740 and at least one optical film 750. The light guide plate 710 is disposed on the back plate 600 and has a first light-incident surface 710a, a light-emitting surface 710b, a bottom surface 710c and a second light-incident surface 710d opposite to the first light-incident surface 710a. The first light-incident surface 710a and the second light-incident surface 710d of the light guide plate 710 are respectively corresponding to the sidewalls 203a and 201a of the back plate 600. Moreover, the light-incident surface 710a and the second light-incident surface 710d respectively have curvatures corresponding to the curvature of the sidewalls 203a and 201a, so that the curvature of the light guide plate 710 can match the curvature of the bottom portion 320 of the back plate 600. In other words, both the light-incident surface 710a and the second light-incident surface 710d are side surfaces of the light guide plate 710 which have the curvature.

Referring to FIG. 4 and FIG. 5, the light source 720 is a light bar which includes a circuit board and plural light-emitting diodes. In one embodiment, the number of light source 720 is two, and the light sources 720 are respectively disposed adjacent to the first light-incident surface 710a and the second light-incident surface 710d of the light guide plate 710. In one embodiment, the light sources 720 have curvatures corresponding to the first light-incident surface 710a and the second light-incident surface 710d, so as to ensure light emitted from the light sources 720 to enter the light guide plate 710 from the first light-incident surface 710a and the second light-incident surface 710d.

As shown in FIG. 4 and FIG. 5, in one embodiment, the reflecting film 740 is disposed on the bottom surface 710c of the light guide plate 710, and a curvature of the reflecting film 740 is corresponding to that of the light guide plate 710. The optical film 750 is disposed on the light-emitting surface 710b of the light guide plate 740, and a curvature of the optical film 750 is also corresponding to that of the light guide plate 710.

Referring to FIG. 4 and FIG. 5 again, the frame 730 is disposed on the back plate 600 and is used to press and fix other members on the back plate 600, such as the light guide plate 710, the light source 720, the reflecting film 740 or optical film 750. Moreover, the frame 730 is fixed on the back plate 600 through connecting structures 730a. In the present embodiment, the connecting structures 730a are convex portions which are disposed on the two opposite outer side surfaces of the frame 730 corresponding to the sidewalls 201a and 203a. Therefore, the connecting structures 730a can be engaged with the hole portions 210e of the back plate 600 so as to fix the frame 730 on the back plate 600. In one embodiment, the frame 730 is made of plastic which has certain degree of deformability. Therefore, when the frame 730 is being disposed on the back plate 600, the connecting structures 730a can be engaged with the hole portions 210e by elastic recovery force from the deformed frame 730, so as to fix the frame 730 on the back plate 600. In addition, the frame 730 has a curvature corresponding to the curvature of the bottom portion 320 of the back plate 600. Hence, when the frame 730 is disposed on the back plate 600, both of appealing appearance and delineation of the backlight module 700 are more attractive.

Figure 6:
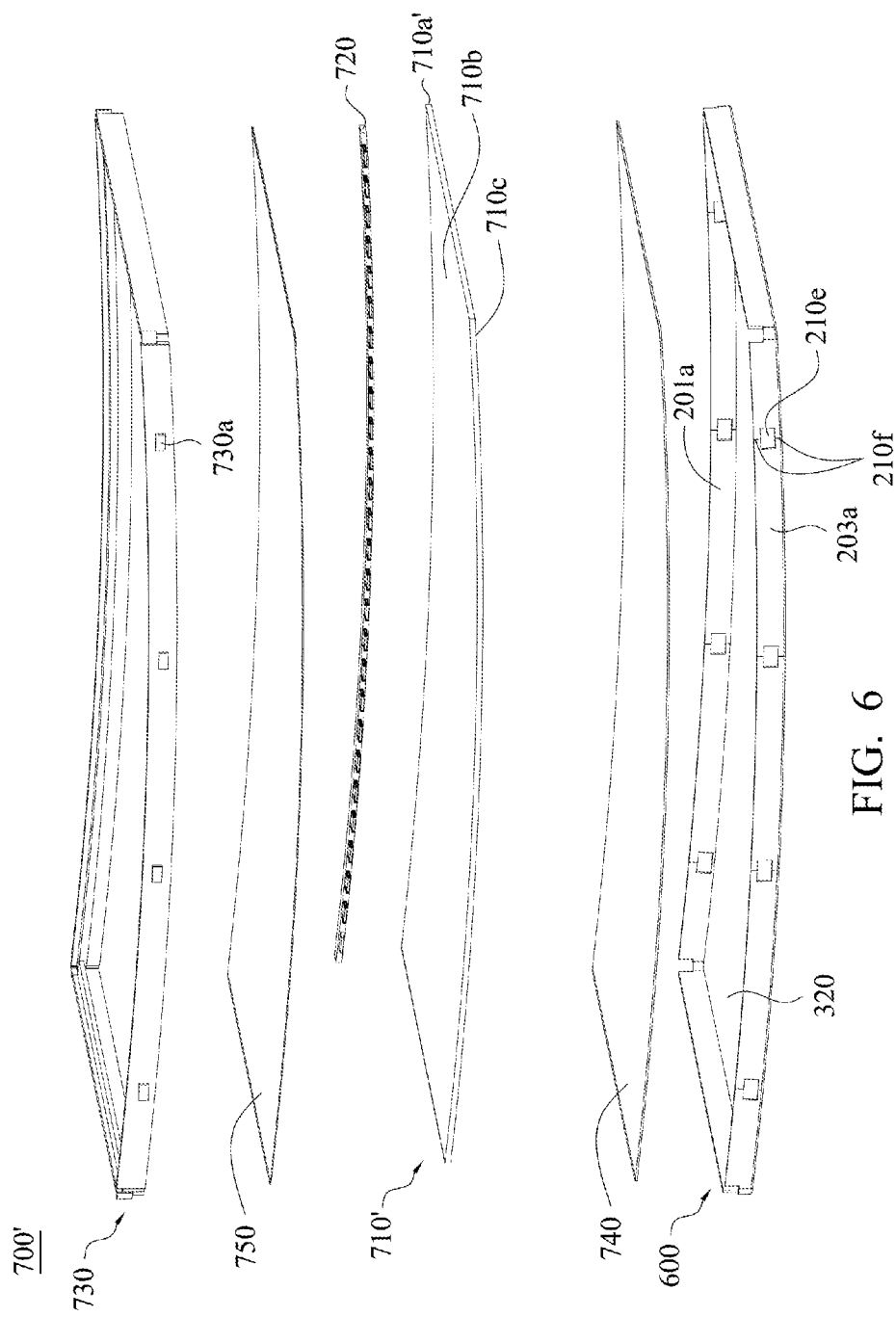
FIG. 6 is a schematic exploded view showing a backlight module in accordance with a second embodiment of the present invention.

It is noted that, the number of the light-incident surfaces of the light guide plate 710 or the light sources 720 is not limited, and it can be at least one or be varied according to the practical requirements. In other embodiments, the number of the light source is one, and the light guide plate has only one light-incident surface. Referring to FIG. 6, FIG. 6 is a schematic exploded view showing a backlight module 700' in accordance with a second embodiment of the present invention. The structure of the backlight module 700' shown in FIG. 6 is similar to that of the backlight module 700 of the aforementioned embodiment, and the main difference therebetween is that a light guide plate 710' of the backlight module 700' only has one light-incident surface 710a', and a light source 720 is disposed adjacent to the light-incident surface 710a' of the light guide plate 710'.

Figure 7:
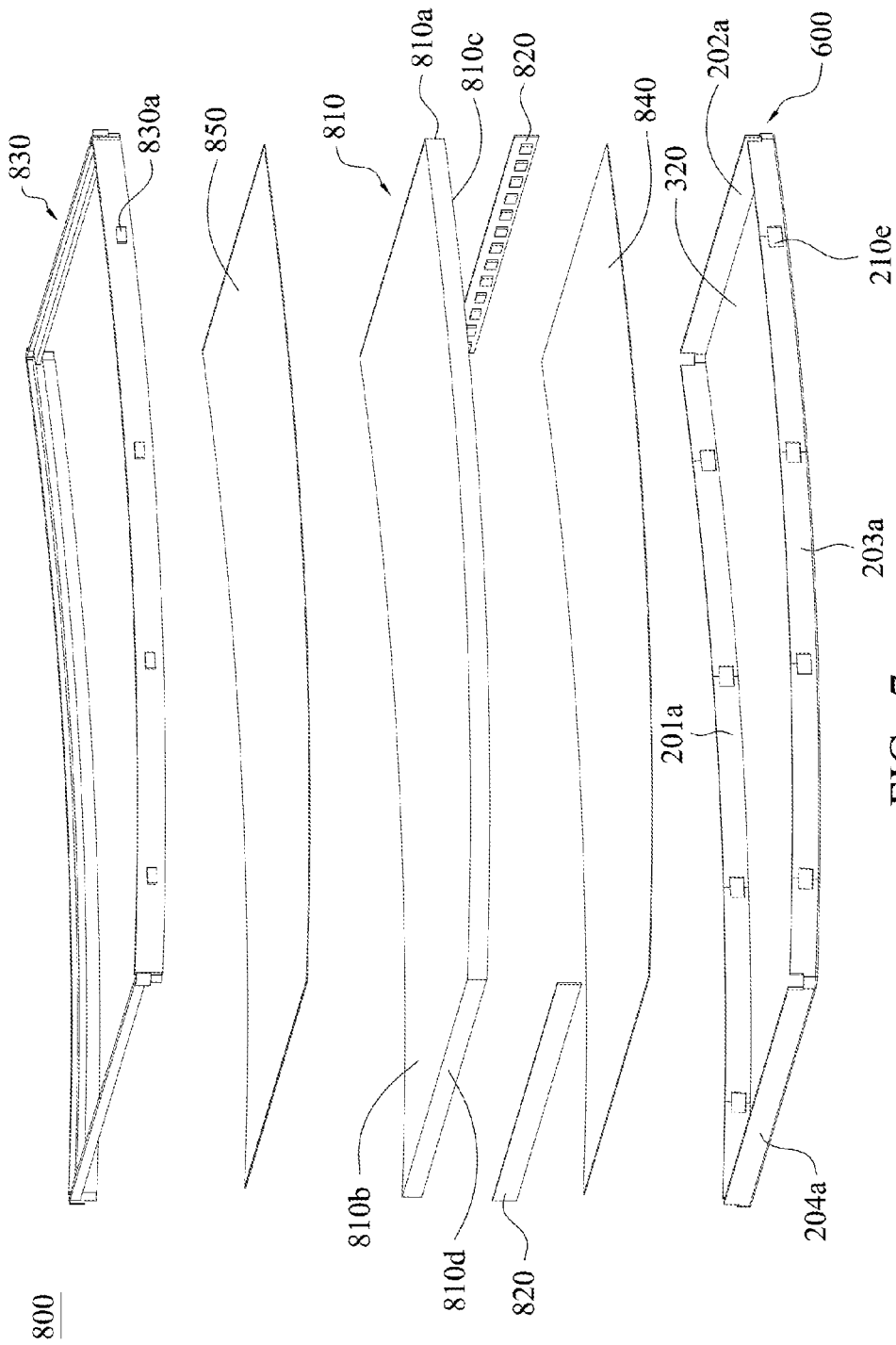
FIG. 7 is a schematic exploded view showing a backlight module in accordance with a third embodiment of the present invention.

It is noted that, in the embodiment as shown in FIG. 4 and FIG. 5, the light source 720 has curvature and is disposed adjacent to the side surface with the curvature of the light guide plate 710 (i.e. the first light-incident surface 710a and the second light-incident surface 710d). In other embodiments, the light source 720 can be disposed on different positions. Referring to FIG. 7, FIG. 7 is a schematic exploded view showing a backlight module 800 in accordance with a third embodiment of the present invention. The backlight module 800 of the present embodiment includes the aforementioned back plate 600, a light guide plate 810, at least one light source 820, a frame 830, a reflecting film 840 and at least one optical film 850. The light guide plate 810 is disposed on the back plate 600 and has a first light-incident surface 810a, a light-emitting surface 810b, a bottom surface 810c and a second light-incident surface 810d opposite to the first light-incident surface 810a. The first light-incident surface 810a and the second light-incident surface 810d of the light guide plate 810 are respectively corresponding to the sidewalls 202a and 204a of the back plate 600. Moreover, both the light-incident surface 810a and the second light-incident surface 810d do not have curvature. In other words, the light-incident surface 810a and the second light-incident surface 810d are two of side surfaces of the light guide plate 810 without curvature. In addition, the other two of side surfaces of the light guide plate 810 corresponding to the sidewalls 201a and 203a have the same curvature with the curvature of the sidewalls 201a and 203a, so that the curvature of the light guide plate 810 can match the curvature of the bottom portion 320 of the back plate 600.

Referring to FIG. 7, the light source 820 is a light bar which includes a circuit board and plural light-emitting diodes. In one embodiment, the number of light source 820 is two, and the light sources 820 are respectively disposed adjacent to the first light-incident surface 810a and the second light-incident surface 810d of the light guide plate 810. In the present embodiment, both the first light-incident surface 810a and the second light-incident surface 810d do not have curvature, so that the light source 820 does not need to have curvature. Accordingly, light emitted from the light source 820 can enter the light guide plate 810 from the first light-incident surface 810a and the second light-incident surface 810d. It is noted that, the number of the light-incident surfaces of the light guide plate 810 or the light sources 820 is not limited, and it can be at least one or be varied according to the practical requirements.

In one embodiment, the reflecting film 840 is disposed on the bottom surface 810c of the light guide plate 810, and a curvature of the reflecting film 840 is corresponding to that of the light guide plate 810. The optical film 850 is disposed on the light-emitting surface 810b of the light guide plate 840, and a curvature of the optical film 850 is also corresponding to that of the light guide plate 810.

Referring to FIG. 7 again, the frame 830 is disposed on the back plate 600 and is used to press and fix other members on the back plate 600, such as the light guide plate 810, the light source 820, the reflecting film 840 or optical film 850. Moreover, the frame 830 is fixed on the back plate 600 through connecting structures 830a. In the present embodiment, the connecting structures 830a are convex portions which are disposed on the two opposite outer side surfaces of the frame 830 corresponding to the sidewalls 201a and 203a. Therefore, the connecting structures 830a can be engaged with the hole portions 210e of the back plate 600 so as to fix the frame 830 on the back plate 600. In one embodiment, the frame 830 is made of plastic and can be fixed on the back plate 600 by elastic engagement. In addition, the frame 830 has a curvature corresponding to the curvature of the bottom portion 320 of the back plate 600. Hence, when the frame 830 is disposed on the back plate 600, both of appealing appearance and delineation of the backlight module 800 are more attractive.

Figure 8:
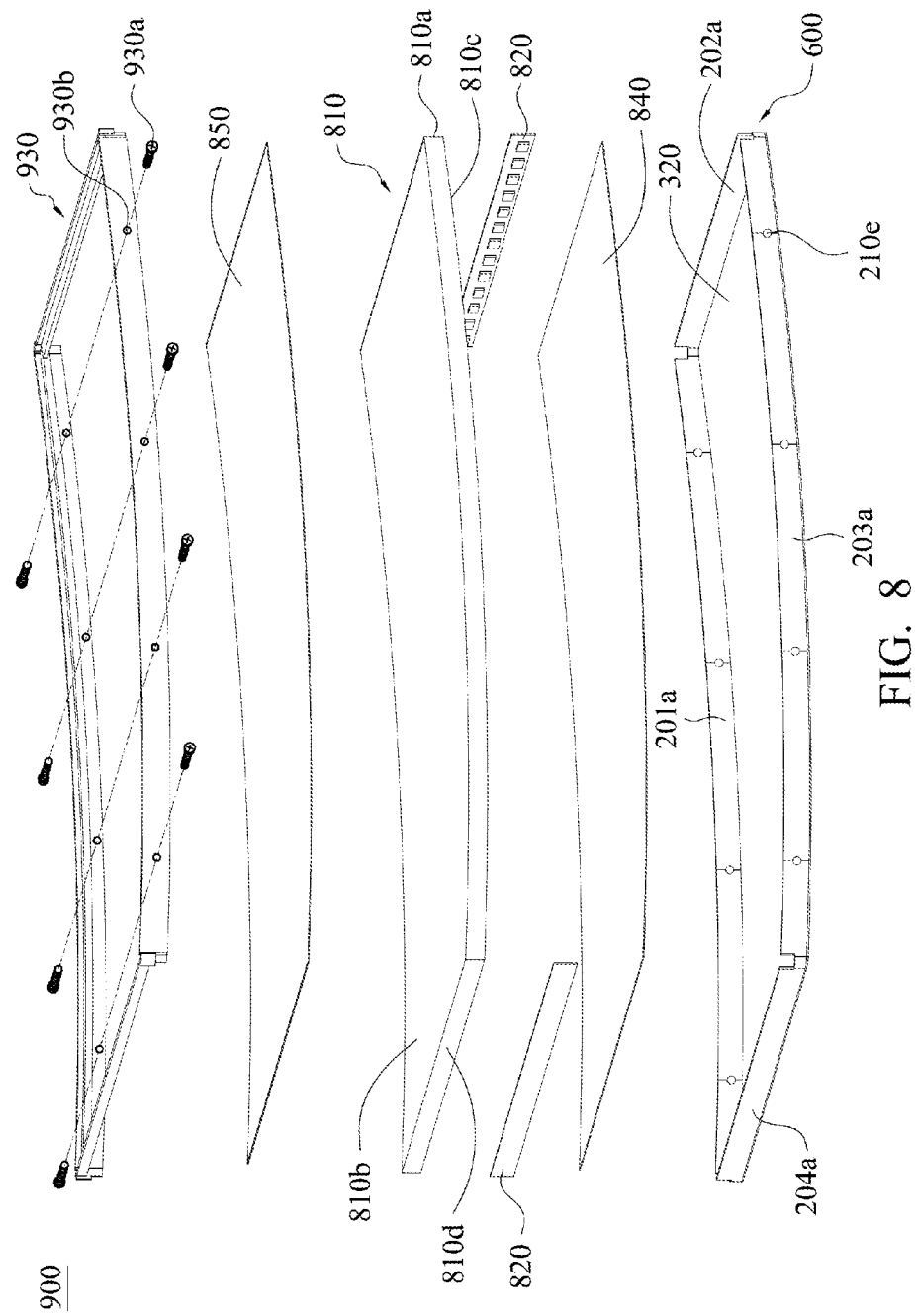
FIG. 8 is a schematic exploded view showing a backlight module in accordance with a fourth embodiment of the present invention.
Figure 9:
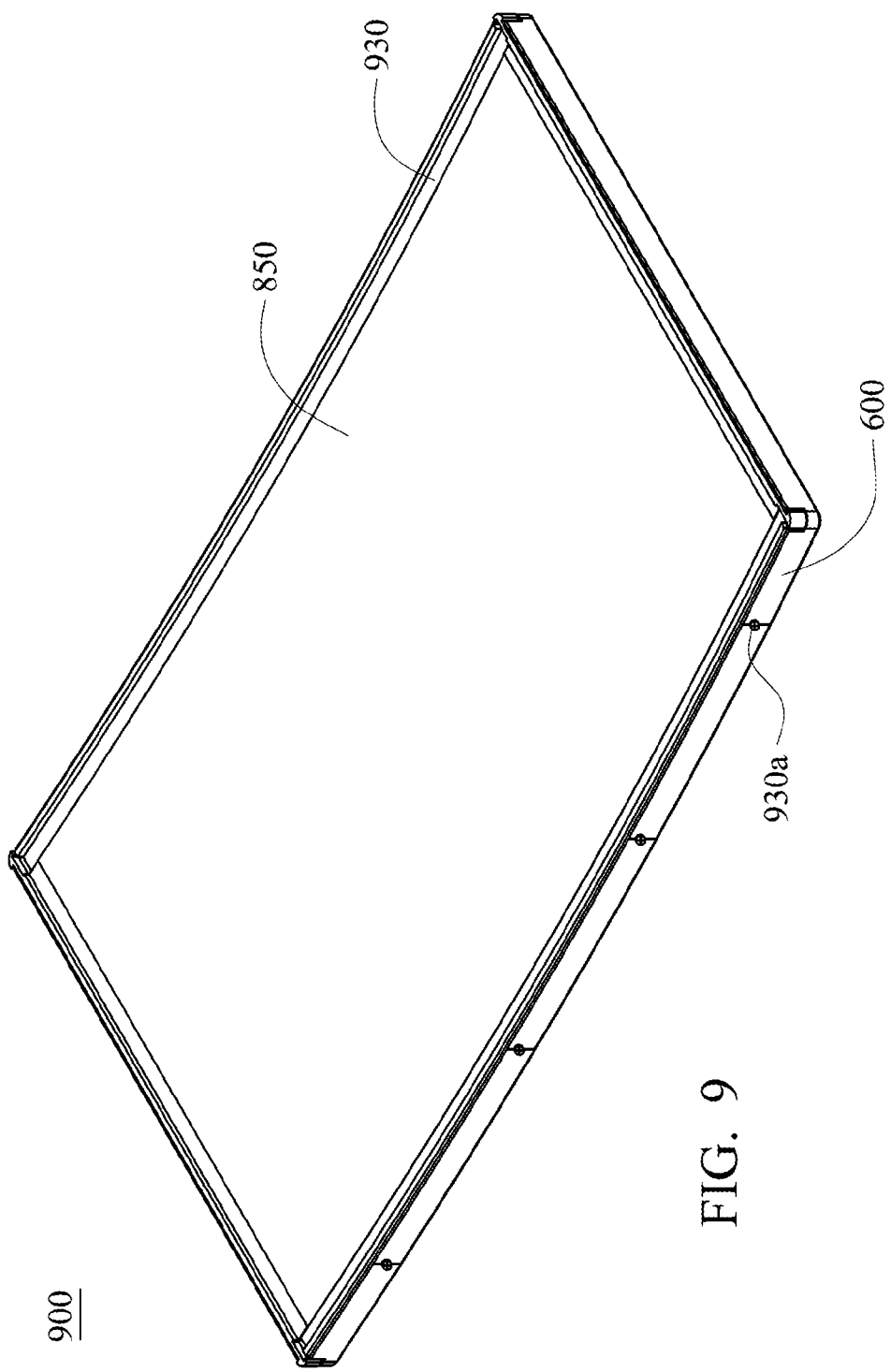
FIG. 9 is a schematic structural diagram showing the backlight module in accordance with the fourth embodiment of the present invention.

In the present invention, the aforementioned backlight module 800 may have different designs. Referring to FIG. 8 and FIG. 9, FIG. 8 and FIG. 9 are a schematic exploded view and a schematic structural diagram showing a backlight module 900 in accordance with a fourth embodiment of the present invention. The structure of the backlight module 900 shown in FIG. 8 and FIG. 9 is similar to that of the backlight module 800 of the aforementioned embodiment, and the main difference therebetween is that connecting structures 930a of the backlight module 900 are screwing members, the hole portions 210e are circular, and a frame 930 of the backlight module 900 has plural through holes 930b. Therefore, when the frame 930 is disposed on the back plate 600, the screwing members can be penetrated through the hole portions 210e and the through holes 930b and be fixed in the hole portions 210e and the through holes 930b, so as to combine the frame 930 and the back plate 600 together.

According to the aforementioned embodiments of the present invention, the present invention uses the design of the grooves and the stamping process to manufacture an arc-shaped back plate, so as to simplify conventional steps of manufacturing the arc-shaped back plate and decrease the fabrication cost. In addition, the shape or the curvature of the back plate can be precisely adjusted by varying the opening angle of each groove, the number of the grooves or the shape of the stamping gauge.

On the other hands, while the arc-shaped back plate is formed, the hole portions are formed from the grooves accordingly. Moreover, the hole portions can be directly connected to the corresponding connecting structures of the frame, so as to achieve an object of rapidly assembling the backlight module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for manufacturing a back plate, comprising:
   preparing a main body, wherein the main body includes a bottom portion and at least one sidewall connected to the bottom portion, the sidewall has a plurality of grooves, and each of the grooves has a first side surface and a second side surface, wherein a first recess and a second recess corresponding to the first recess are respectively disposed on the first side surface and the second side surface;
   applying an external force on the bottom portion to form each of the bottom portion and the sidewalls into an arc shape, wherein the application of the external force causes the first side surface to contact the second side surface of each groove, and a hole portion to be formed between the first recess and the second recess; and
   after the step of applying the external force on the bottom portion, performing a connecting process to connect the first side surface to the second side surface of each groove, so that a peripheral edge of the hole portion is enclosed and the contact of the first side surface to the second side surface forms at least one connecting portion which extends from the peripheral edge of the hole portion.

2. The method of claim 1, wherein the connecting process comprises using a laser welding method, a screwing method or an adhering method.

3. The method of claim 1, wherein the step of preparing the main body further comprises:

providing a plate, wherein the plate has at least one edge portion;

forming the grooves on the edge portion; and bending the edge portion to form the sidewall.

4. The method of claim 3, wherein the step of forming the grooves comprises using a stamping process.

5. The method of claim 1, wherein the step of applying the external force on the bottom portion comprises an operation of using a stamping gauge.

6. The method of claim 1, wherein each of the grooves is a V-shaped structure.

7. A back plate, comprising:

a bottom portion having a curvature; and at least one sidewall connected to the bottom portion, wherein the sidewall has a curvature which is corresponding to the curvature of the bottom portion;

wherein the sidewall has a plurality of hole portions and a plurality of connecting portions adjacent to the hole portions;

wherein each of the connecting portions comprises a first side surface and a second side surface contacting the first side surface;

wherein a peripheral edge of each of the hole portions is enclosed by the contact of the first side surface to the second side surface, and at least one connecting portion is formed and extends from the peripheral edge of the hole portion.

8. A backlight module, comprising:

a back plate comprising a bottom portion and at least one sidewall connected to the bottom portion, wherein the bottom portion has a curvature corresponding to a curvature of the sidewall, and the sidewall has a plurality of hole portions and a plurality of connecting portions adjacent to the hole portions, wherein each of the connecting portions comprises a first side surface and a second side surface contacting the first side surface, wherein a peripheral edge of each of the hole portions is enclosed by the contact of the first side surface to the second side surface, and at least one connecting portion is formed and extends from the peripheral edge of the hole portion;

a light guide plate disposed on the back plate, wherein the light guide plate has at least one light-incident surface, and a curvature of the light guide plate is corresponding to the curvature of the bottom portion;

at least one light source disposed on the back plate and adjacent to the light-incident surface of the light guide plate; and a frame disposed on the back plate, wherein there are a plurality of connecting structures disposed on the at least one outer side surface of the frame which is corresponding to the sidewall, and the connecting structures are connected to the hole portions.

9. The backlight module of claim 8, wherein each of the connecting structures is a convex portion or a screwing member.

10. The backlight module of claim 8, wherein the light guide plate comprises at least one side surface with curvature and at least one side surface without curvature, and the light-incident surface is the side surface with curvature.

11. The backlight module of claim 8, wherein the light guide plate comprises at least one side surface with curvature and at least one side surface without curvature, and the light-incident surface is the side surface without curvature.

12. The backlight module of claim 8, wherein the frame has a curvature corresponding to the curvature of the bottom portion.

13. The backlight module of claim 8, further comprising a reflecting film disposed on a bottom surface of the light guide plate, wherein a curvature of the reflecting film is corresponding to the curvature of the light guide plate.

14. The backlight module of claim 8, further comprising at least one optical film disposed on a light-emitting surface of the light guide plate, wherein a curvature of the optical film is corresponding to the curvature of the light guide plate.

* * * * *